(12) United States Patent
Tsai

(10) Patent No.: US 10,101,167 B2
(45) Date of Patent: Oct. 16, 2018

(54) ELECTRONIC DEVICE AND NAVIGATION METHOD

(71) Applicant: Chiun Mai Communication Systems, Inc., New Taipei (TW)

(72) Inventor: Lun-Yuan Tsai, New Taipei (TW)

(73) Assignee: Chiun Mai Communication Systems, Inc., New Taipei (TW)

(*) Notice: Subject to any disclaimer, the term of this patent is extended or adjusted under 35 U.S.C. 154(b) by 0 days.

(21) Appl. No.: 15/434,031

(22) Filed: Feb. 15, 2017

(65) Prior Publication Data

US 2017/0276498 A1    Sep. 28, 2017

(30) Foreign Application Priority Data

Mar. 22, 2016 (TW) .............................. 105108892 A

(51) Int. Cl.
| | |
|---|---|
| G01C 21/34 | (2006.01) |
| G01C 21/36 | (2006.01) |
| H04W 4/02 | (2018.01) |
| G08G 1/0968 | (2006.01) |

(52) U.S. Cl.
CPC ..... *G01C 21/3438* (2013.01); *G01C 21/3415* (2013.01); *G01C 21/362* (2013.01); *G08G 1/096805* (2013.01); *G08G 1/096811* (2013.01); *G08G 1/096816* (2013.01); *G08G 1/096844* (2013.01); *G08G 1/096883* (2013.01); *H04W 4/023* (2013.01)

(58) Field of Classification Search
CPC ............ G01C 21/3415; G01C 21/3438; G01C 21/362; G08G 1/096805; G08G 1/096811; G08G 1/096816; G08G 1/096844; G08G 1/096883; H04W 4/023
See application file for complete search history.

(56) References Cited

U.S. PATENT DOCUMENTS

| | | | | |
|---|---|---|---|---|
| 6,347,278 B2* | 2/2002 | Ito | ...................... | G01C 21/3415 701/411 |
| 6,434,478 B1* | 8/2002 | Ikeda | ...................... | G01C 21/26 701/533 |
| 6,847,889 B2* | 1/2005 | Park et al. | ....... | G08G 1/096811 701/420 |
| 6,879,908 B2* | 4/2005 | Takenaga | ............... | G01C 21/34 701/420 |
| 7,389,179 B2* | 6/2008 | Jin et al. | .......... | G08G 1/096811 701/517 |
| 2003/0229444 A1* | 12/2003 | Bullock et al. | .. | G08G 1/096811 701/420 |
| 2007/0168118 A1* | 7/2007 | Lappe et al. | ........... | G01C 21/26 701/408 |

(Continued)

FOREIGN PATENT DOCUMENTS

CN        1288610 C      12/2006

*Primary Examiner* — Dale W Hilgendorf
(74) *Attorney, Agent, or Firm* — ScienBiziP, P.C.

(57) ABSTRACT

A navigation method includes establishing a communication connection between a first electronic device and a second electronic device. A current position of the first electronic device is obtained. The current position of the first electronic device is sent to the second electronic device. Once a confirmed navigation route is obtained from the second electronic device, navigate according to the confirmed navigation route.

30 Claims, 6 Drawing Sheets

(56) References Cited

U.S. PATENT DOCUMENTS

2007/0299600 A1* 12/2007 Liberto et al. ..... G01C 21/3415
  701/414
2011/0264366 A1* 10/2011 Cabral ............... G01C 21/3415
  701/533

* cited by examiner

ELECTRONIC DEVICE AND NAVIGATION
METHOD

CROSS-REFERENCE TO RELATED
APPLICATIONS

This application claims priority to Taiwanese Patent Application No. 105108892 filed on Mar. 22, 2016, the contents of which are incorporated by reference herein.

FIELD

The subject matter herein generally relates to navigation technology, and particularly to an electronic device and a navigation method.

BACKGROUND

When a visitor plans to go to a new place, the visitor may use a navigation system of an electronic device such as a mobile phone to direct the visitor to the place. However, the visitor may get in trouble when a navigation route of the navigation system is wrong, or current road conditions of the navigation route are temporarily changed because of traffic blocks, roadbuilding, or the like.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
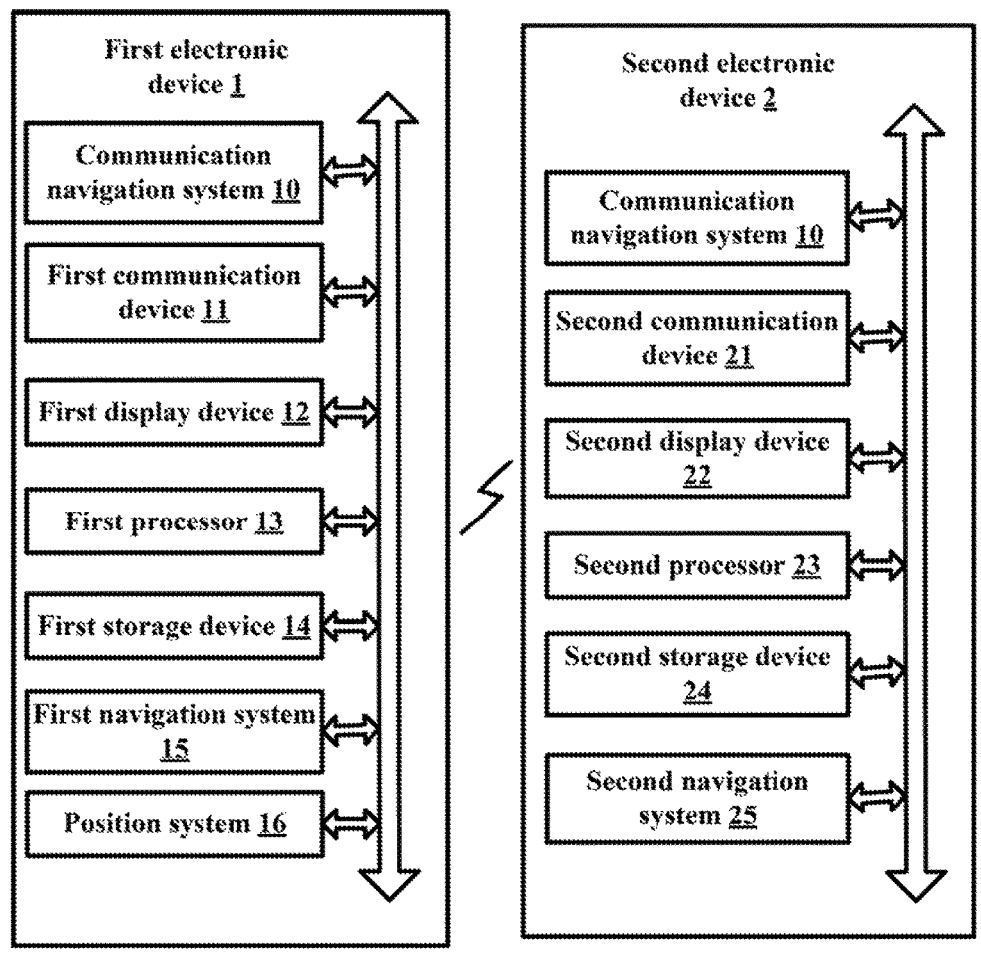
FIG. 1 is a block diagram of an exemplary embodiment of a first electronic device and a second electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" exemplary embodiment in this disclosure are not necessarily to the same exemplary embodiment, and such references mean "at least one."

Furthermore, the term "module", as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an exemplary embodiment of a first electronic device and a second electronic device, cooperating for navigation purposes. Depending on the exemplary embodiment, each of a first electronic device 1 and a second electronic device 2 includes a communication navigation system 10.

Depending on the exemplary embodiment, the first electronic device 1 can be an electronic device of a first user who is not familiar with road conditions surrounding a destination position. The second electronic device 2 can be an electronic device of a second user who is familiar with the road conditions surrounding the destination position. Depending on the exemplary embodiment, the first user can be a visitor who plans to visit and meet the second user, i.e., the second user can be treated as interviewee. In other exemplary embodiments, the second electronic device 2 can also be an electronic device of an another user, or can be a server that is stored with the road conditions surrounding the destination position. The first electronic device 1 can be an electronic device that is able to communicate with the server. In at least one exemplary embodiment, the road conditions surrounding the destination position can be defined to be a traffic block, roadbuilding, or the like, where such conditions exist in each road belonging to a predetermined geographical range around the destination position. The predetermined geographical range can be defined as a circle having a predetermined radius value (for example, 50 or 500 or 5000 meters), and the center of the circle is the destination position.

In at least one exemplary embodiment, the first electronic device 1 can include a first communication device 11, and the second electronic device 2 can include a second communication device 21. The first electronic device 1 and the second electronic device 2 can communicate with each other through the first communication device 11 and the second communication device 21. In at least one exemplary embodiment, the first communication device 11 and the second communication device 21 can be wireless communication devices. For example, the first communication device 11 and the second communication device 21 can be wireless network cards, or general packet radio service (GPRS) modules. In at least one exemplary embodiment, the first electronic device 1 and the second electronic device 2 can wirelessly communicate with each other through the first communication device 11 and the second communication device 21. In at least one exemplary embodiment, the first electronic device 1 can be a mobile phone, a tablet computer, a vehicle navigator, or any other device configured with a position function and a communication function. The second electronic device 2 can be a mobile phone, a tablet computer, a vehicle navigator, or any other device configured with the communication function. In other exemplary embodiments, the second electronic device 2 can be a personal computer, a server, or any other device configured with the communication function.

In at least one exemplary embodiment, the first electronic device 1 further can include, but is not limited to, a first display device 12, a first processor 13, a first storage device 14, a first navigation system 15, and a position device 16. The second electronic device 2 further can include, but is not limited to, a second display device 22, a second processor 23, a second storage device 24, and a second navigation system 25. FIG. 1 illustrates only one example of the first electronic device 1 and the second electronic device 2. Each of the first electronic device 1 and the second electronic device 2 can include more or fewer components than illustrated, or have a different configuration of the various components in other exemplary embodiments.

The first display device 12 and the second display device 22 can be used to display all kinds of information such as navigation routes. The first processor 13 can be used to execute program instructions of applications installed in the first electronic device 1, and cause the first electronic device 1 to execute corresponding operations. The second processor 13 can be used to execute program instructions of applications installed in the second electronic device 2, and cause the second electronic device 2 to execute corresponding operations.

The first storage device 14 can be used to store all kinds of data such as codes of program instructions of the first electronic device 1. In at least one exemplary embodiment, the first storage device 14 can be an internal storage device such as a memory of the first electronic device 1. In other exemplary embodiments, the first storage device 14 can be external storage device of the first electronic device 1. For example, the first storage device 14 can be a secure digital card, a smart media card, or a flash card. The second storage device 24 can be used to store all kinds of data such as codes of program instructions of the second electronic device 2. In at least one exemplary embodiment, the second storage device 24 can be an internal storage device such as a memory of the second electronic device 2. In other exemplary embodiments, the second storage device 24 can be external storage device of the second electronic device 2. For example, the second storage device 24 can be a secure digital card, a smart media card, or a flash card.

Each of the first navigation system 15 and the second navigation system 25 can be used to calculate a navigation route from a start position to a destination position, and can navigate based on the calculated navigation route or a designated navigation route. The position device 16 can be used to obtain a current position of the first electronic device 1. In at least one exemplary embodiment, the positioning device 16 can be a Global Positioning System (GPS), an Assisted Global Positioning System (AGPS), a BeiDou Navigation Satellite System (BDS), or a Global Navigation Satellite System (GLONASS).

In at least one exemplary embodiment, each of the first electronic device 1 and the second electronic device 2 is installed with the communication navigation system 10. In the first electronic device 1, the communication navigation system 10 can obtain the current position of the first electronic device 1, and can send the current position of the first electronic device 1 to the second electronic device 2. The communication navigation system 10 can also receive a navigation route from the second electronic device 2, and can navigate according to the received navigation route. In the second electronic device 2, the communication navigation system 10 can receive the current position of the first electronic device 1, and can determine a navigation route according to the current position of the first electronic device 1 and a destination position of the first electronic device 1. The second electronic device 2 can send the navigation route to the first electronic device 1. In at least one exemplary embodiment, the destination position can be designated by the first user of the first electronic device 1, or can be designated by the second user of the second electronic device 2.

Figure 2:
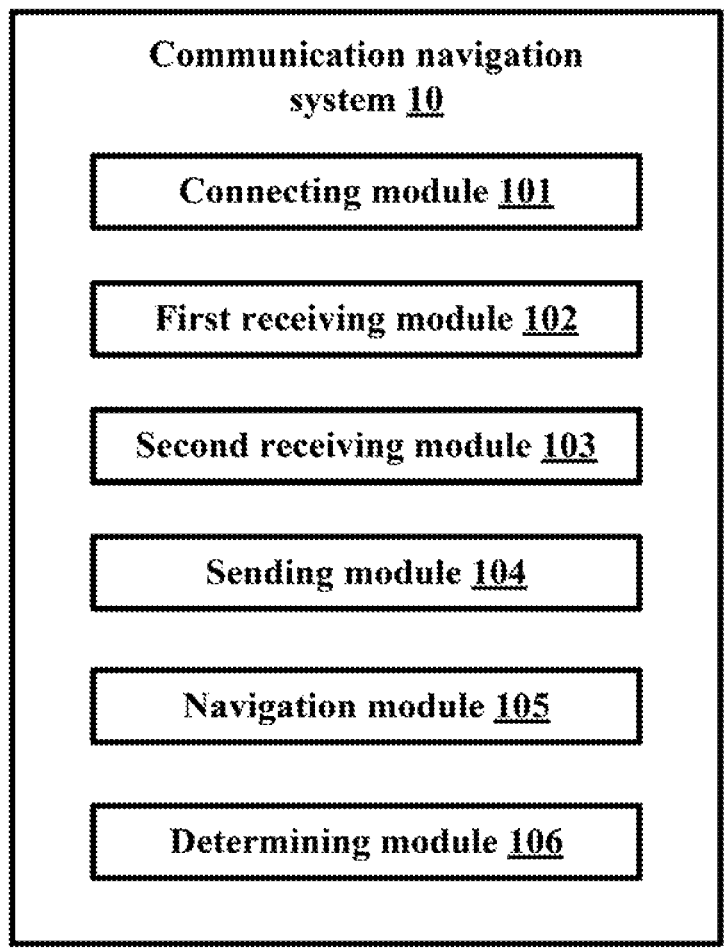
FIG. 2 is a block diagram of an exemplary embodiment of modules of a communication navigation system included in the first electronic device and the second electronic device of FIG. 1.

FIG. 2 is a block diagram of an exemplary embodiment of modules of the communication navigation system 10. In at least one exemplary embodiment, the communication navigation system 10 can include a connecting module 101, a first receiving module 102, a second receiving module 103, a sending module 104, a navigation module 105, and a determining module 106. When the communication navigation system 10 is installed in the first electronic device 1, the establishing module 101, the first receiving module 102, the navigation module 105, and the determining module 106 are executed by the first processor 13. When the communication navigation system 10 is installed in the second electronic device 2, the second receiving module 103, the sending module 104, and the determining module 106 are executed by the second processor 23. The modules 101-106 include computer instructions or codes in the form of one or more programs that may be executed by the first processor 13 and the second processor 23.

Figure 3:
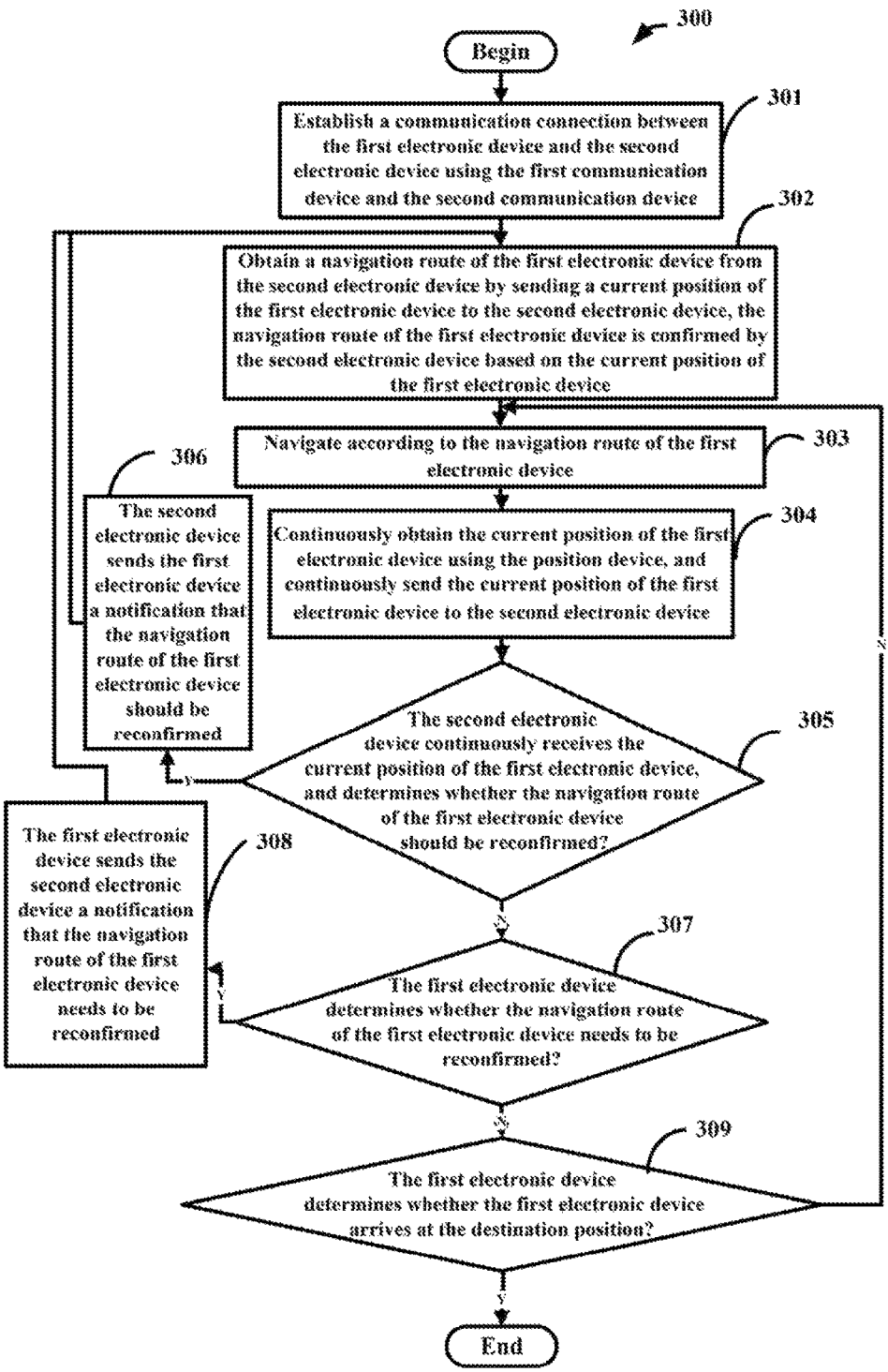
FIG. 3 is a flowchart of an exemplary embodiment of a navigation method.

FIG. 3 illustrates an exemplary embodiment of a flowchart of a navigation method. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block 301. Depending on the exemplary embodiment, additional steps can be added, others removed, and the ordering of the steps can be changed.

At block 301, the connecting module 101 executed by the first electronic device 1 can establish a communication connection between the first electronic device 1 and the second electronic device 1 using the first communication device 11 and the second communication device 21. In at least one exemplary embodiment, the first communication device 11 and the second communication device 21 are wireless network cards. The connecting module 101 executed by the first electronic device 1 can first connect to a wireless network through the first communication device 11, and then establish the communication connection with the second electronic device 2 that has connected to the wireless network through the second communication device 21. In other exemplary embodiments, before the communication connection is established, identification information (e.g., an email address, a telephone number, or a user account) should be input to identify a current user of the second electronic device 2 or identify the second electronic device 2.

At block 302, the first receiving module 102 executed by the first electronic device 1 can obtain a navigation route of the first electronic device 1 from the second electronic device 2 by sending a current position of the first electronic device 1 to the second electronic device 2. The navigation route of the first electronic device 1 is confirmed by the second electronic device 2 based on the current position of the first electronic device 1.

Figure 4:
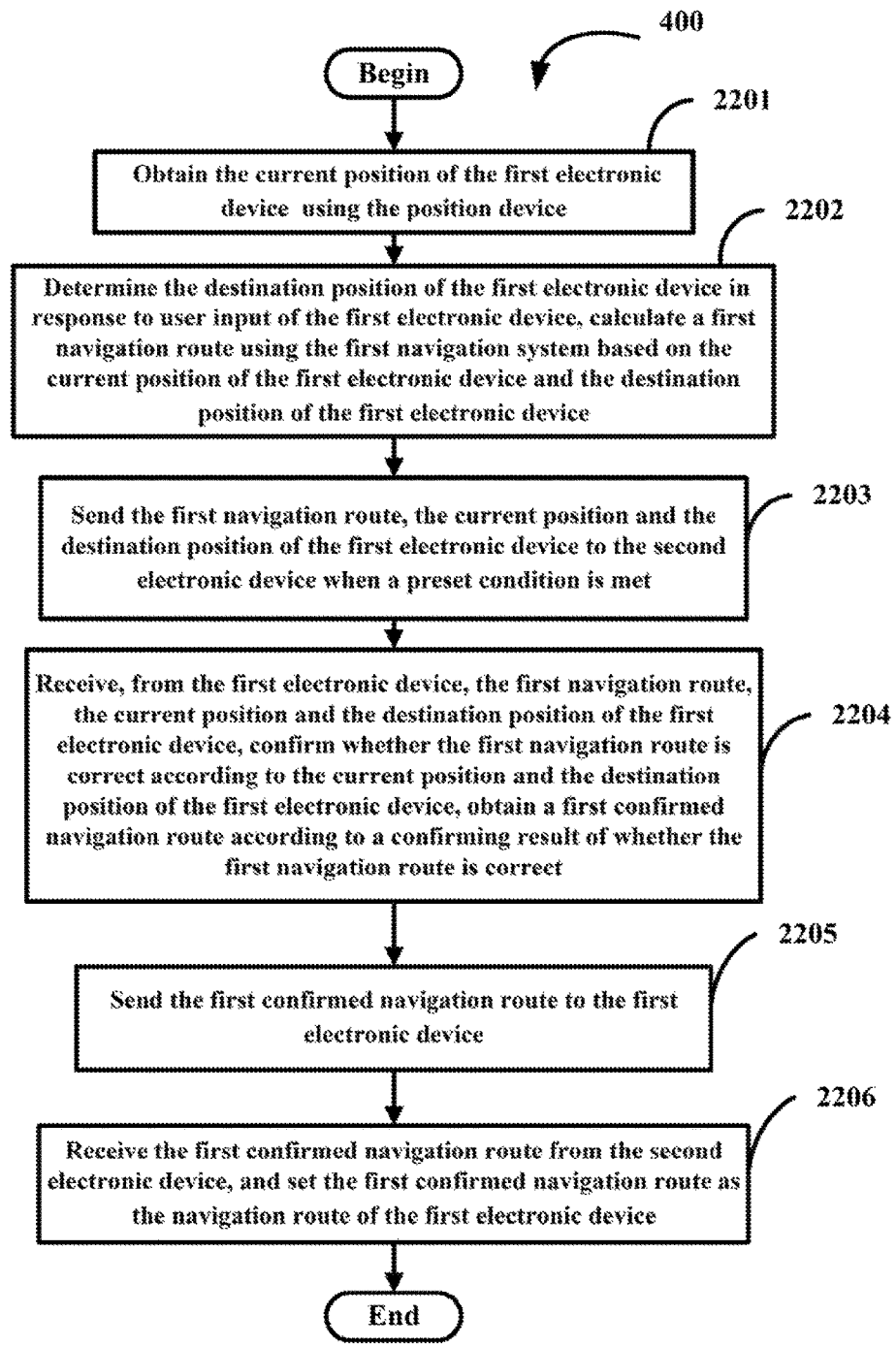
FIG. 4 is a flowchart of an exemplary embodiment of a first method of obtaining a navigation route.
Figure 5:
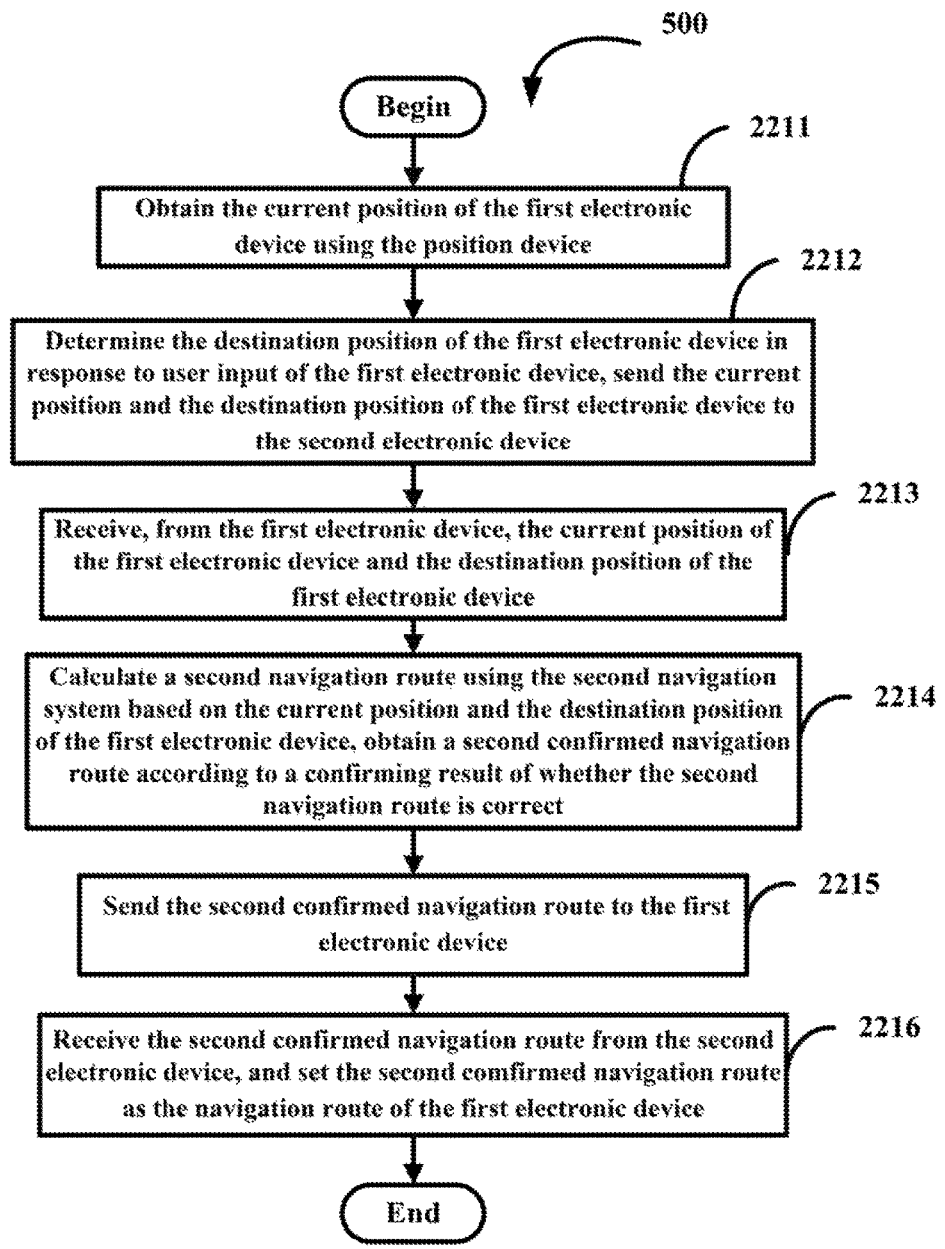
FIG. 5 is a flowchart of an exemplary embodiment of a second method of obtaining the navigation route.
Figure 6:
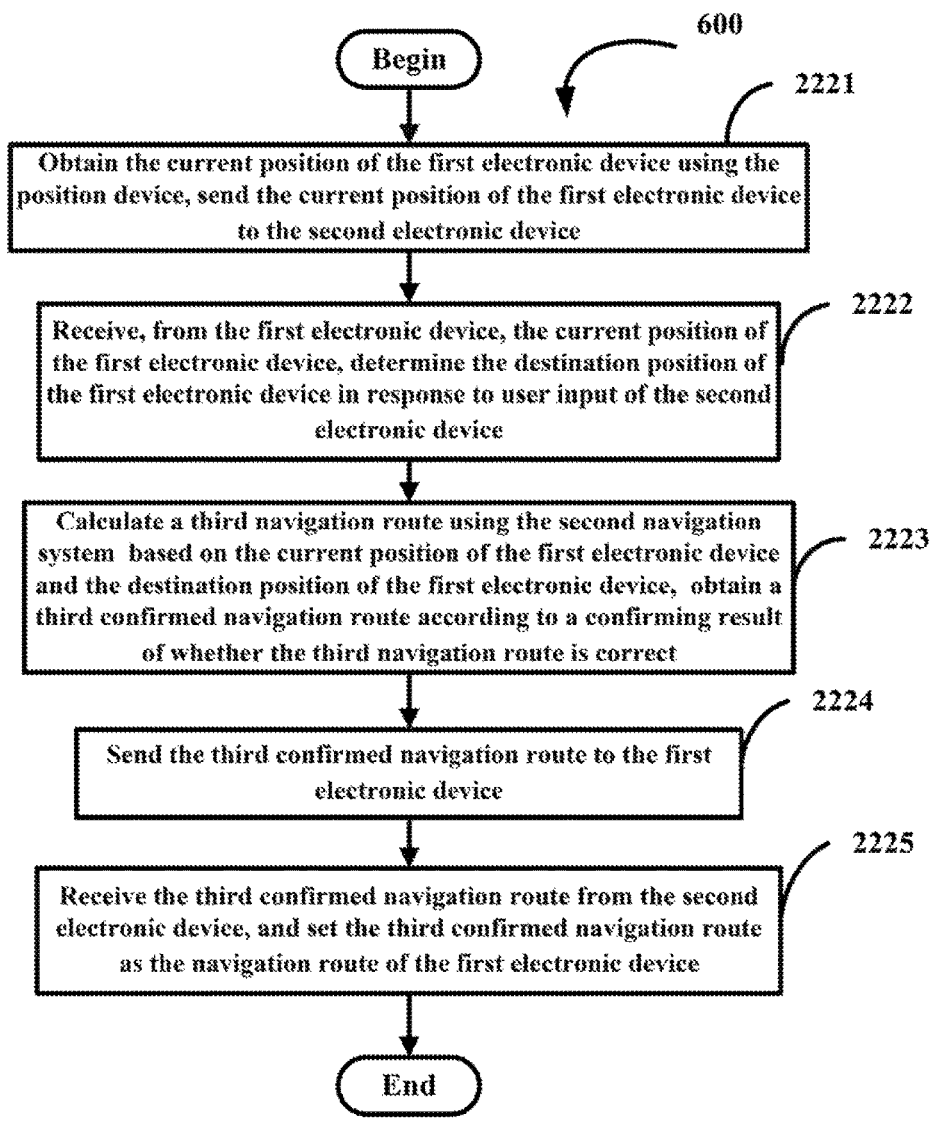
FIG. 6 is a flowchart of an exemplary embodiment of a third method of obtaining the navigation route.

Exemplary embodiments of methods of the first receiving module 102 obtaining the navigation route of the first electronic device 1 will be provided together with the illustrations and information in FIG. 4, FIG. 5, and FIG. 6.

At block 303, the navigation module 105 executed by the first electronic device 1 can navigate according to the navigation route of the first electronic device 1. In at least one exemplary embodiment, before navigating according to the navigation route of the first electronic device 1, the navigation module 105 executed by the first electronic device 1 can determine whether the first user of the first electronic device 1 accepts the navigation route of the first electronic device 1 by transmitting a prompt. When the first user accepts the navigation route of the first electronic device 1, the navigation module 105 begins to navigate according to the navigation route of the first electronic device 1.

At block 304, the navigation module 105 executed by the first electronic device 1 can continuously obtain the current position of the first electronic device 1 using the position device 16, and continuously send the current position of the first electronic device 1 to the second electronic device 2.

At block 305, the determining module 106 executed by the second electronic device 2 can continuously receive the current position of the first electronic device 1. The determining module 106 executed by the second electronic device 2 can further determine whether the navigation route of the first electronic device 1 should be reconfirmed according to the current position of the first electronic device 1, the destination position of the first electronic device 1, and the navigation route of the first electronic device 1. When the determining module 106 executed by the second electronic device 2 determines that the navigation route of the first electronic device 1 should be reconfirmed, the process goes to block 306. When the determining module 106 executed by the second electronic device 2 determines that the navigation route of the first electronic device 1 does not need to be reconfirmed, the process goes to block 307.

In at least one exemplary embodiment, the second user of the second electronic device 2 is familiar with the road conditions surrounding the destination position of the first electronic device 1. The determining module 106 executed by the second electronic device 2 can display the current position of the first electronic device 1 on the second display device 22 of the second electronic device 2, such that the second user can determine whether the navigation route of the first electronic device 1 should be reconfirmed. In at least one exemplary embodiment, the determining module 106 executed by the second electronic device 2 further can display the current position of the first electronic device 1 on the navigation route of the first electronic device 1 that is displayed on the second display device 22.

In other exemplary embodiments, the second electronic device 2 is the server that is stored with the road conditions surrounding destination position of the first electronic device 1. The determining module 106 executed by the second electronic device 2 can determine whether the navigation route of the first electronic device 1 should be reconfirmed according to the current position of the first electronic device 1, the destination position of the first electronic device 1, the navigation route of the first electronic device 1, and the road conditions surrounding the destination position of the first electronic device 1. For example, when traffic block exists in one road that is between the current position and the destination position of the first electronic device 1, and the one road belongs to the navigation route of the first electronic device 1, the determining module 106 executed by the second electronic device 2 can determine that the navigation route of the first electronic device 1 should be reconfirmed. When no road condition that is blocking traffic exists in each road that is between the current position and the destination position of the first electronic device 1, and the each road belongs to the navigation route of the first electronic device 1, the determining module 106 executed by the second electronic device 2 can determine the navigation route of the first electronic device 1 does not need to be reconfirmed.

At block 306, the determining module 106 executed by the second electronic device 2 can send the first electronic device 1 a notification that the navigation route of the first electronic device 1 should be reconfirmed. When the block 306 is executed, the process goes to block 302.

In other exemplary embodiments, when the determining module 106 executed by the second electronic device 2 determines that the navigation route of the first electronic device 1 needs to be reconfirmed, the determining module 106 executed by the second electronic device 2 does not send the notification to the first electronic device 1 and the process directly goes to block 302.

At block 307, the determining module 106 executed by the first electronic device 1 can determine whether the navigation route of the first electronic device 1 needs to be reconfirmed. When the determining module 106 executed by the first electronic device 1 determines that the navigation route of the first electronic device 1 needs to be reconfirmed, the process goes to block 308. When the determining module 106 executed by the first electronic device 1 determines that the navigation route of the first electronic device 1 does not need to be reconfirmed, the process goes to block 309.

In at least one exemplary embodiment, when the first electronic device 1 moves off the navigation route of the first electronic device 1, the determining module 106 executed by the first electronic device 1 determines that the navigation route of the first electronic device 1 need to be reconfirmed. When the first electronic device 1 moves according to the navigation route of the first electronic device 1, the determining module 106 executed by the first electronic device 1 determines that the navigation route of the first electronic device 1 does not need to be reconfirmed. In at least one exemplary embodiment, the determining module 106 executed by the first electronic device 1 can select a number of positions from the navigation route of the first electronic device 1, and obtain the current position of the first electronic device 1 at predetermined time intervals (e.g., every two seconds). The determining module 106 executed by the first electronic device 1 can continuously calculate a distance value between the current position of the first electronic device 1 and the nearest one of the number of positions, wherein the nearest position is ahead of the current position of the first electronic device 1. The determining module 106 executed by the first electronic device 1 can further continuously calculate a difference value between two adjacent calculated distance values by subtracting a current calculated distance value from a previously calculated distance value. When the difference value is greater than a preset value (for example, 10 meters), the determining module 106 executed by the first electronic device 1 can determine that the first electronic device 1 is off the navigation route of the first electronic device 1. When the difference value is less than or equal to the preset value the determining module 106 executed by the first electronic device 1 can determine that the first electronic device 1 has not moved off the navigation route of the first electronic device 1. In other exemplary embodiments, the determining module 106 executed by the second electronic device 2 can determine whether updating of the navigation route of the first electronic device 1 is required by determining whether the first electronic device 1 moves off the navigation route of the first electronic device 1.

In other exemplary embodiments, the determining module 106 executed by the first electronic device 1 can calculate a total movement distance value of the first electronic device 1, and can determine whether the total movement distance is greater than a predetermined movement distance value. The total movement distance value can be defined to be a movement distance value from the start position to the current position of the first electronic device 1. In at least one exemplary embodiment, when the total movement distance is greater than the predetermined movement distance value, the determining module 106 executed by the first electronic device 1 can determine that the navigation route of the first electronic device 1 needs to be reconfirmed. When the total movement distance is less than or equal to the predetermined movement distance value, the determining module 106 executed by the first electronic device 1 can determine that the navigation route of the first electronic device 1 does not need to be reconfirmed. In at least one exemplary embodiment, the predetermined movement distance value can be preset according to the navigation routes of the first electronic device 1. For example, the predetermined movement distance value equals a total estimated distance value of the navigation route of the first electronic device 1 multiplied by a preset proportion. In at least one exemplary embodiment, the preset proportion can be a proportion that is greater than or equal to 100%. In at least one exemplary embodiment, the total estimated distance value of the navigation route of the first electronic device 1 can be calculated using the start position and the destination position of the first electronic device. In other exemplary embodiments, the determining module 106 executed by the second electronic device 2 can determine whether the navigation route of the first electronic device 1 needs to be reconfirmed according to a determination as to whether the total movement distance is greater than the predetermined movement distance value.

In other exemplary embodiments, the determining module 106 executed by the first electronic device 1 can calculate a total movement time length of the first electronic device 1, and can determine whether the total movement time length is greater than a predetermined time length. The total movement time length can be defined to be a time difference between a time when the first electronic device 1 at the start position and a current time when the first electronic device 1 at the current position. In at least one exemplary embodiment, when the total movement time length is greater than the predetermined time length, the determining module 106 executed by the first electronic device 1 can determine that the navigation route of the first electronic device 1 needs to be reconfirmed. When the total movement time length is less than or equal to the predetermined time length, the determining module 106 executed by the first electronic device 1 can determine that the navigation route of the first electronic device 1 does not need to be reconfirmed. In at least one exemplary embodiment, the predetermined time length can be preset according to the navigation route of the first electronic device 1. For example, the predetermined time length equals an estimated time length of the navigation route of the first electronic device 1 multiplied by a preset proportion. In at least one exemplary embodiment, the preset proportion can be a proportion that is greater than or equal to 100%. In at least one exemplary embodiment, the estimated time length of the navigation route of the first electronic device 1 can be calculated using the first navigation system 15 based on the total estimated distance value of the navigation route of the first electronic device 1 and a preset moving speed (for example, 60 kilometers per hour). In other exemplary embodiments, the determining module 106 executed by the second electronic device 2 can determine whether the navigation route of the first electronic device 1 needs to be reconfirmed according to a determination as to whether the total movement time length is greater than the predetermined time length.

At block 308, the determining module 106 executed by the first electronic device 1 can send the second electronic device 2 a notification that the navigation route of the first electronic device 1 needs to be reconfirmed. When the block 308 is executed, the process goes to block 302.

In other exemplary embodiments, when the determining module 106 executed by the first electronic device 1 determines that the navigation route of the first electronic device 1 needs to be reconfirmed, and the block 308 is executed, the process can be ended.

In other exemplary embodiments, when the determining module 106 executed by the first electronic device 1 determines that the navigation route of the first electronic device 1 needs to be reconfirmed, the determining module 106 executed by the first electronic device 1 does not send the notification to the second electronic device 2, and the process directly goes to block 302.

At block 309, the determining module 106 executed by the first electronic device 1 determines whether the first electronic device 1 arrives at the destination position. When the first electronic device 1 arrives at the destination position, the process is ended. When the first electronic device 1 does not arrive at the destination position, the process goes to block 303.

In other exemplary embodiments, the determining module 106 executed by the first electronic device 1 can calculate a distance value between the current position and the destination position of the first electronic device 1. The determining module 106 executed by the first electronic device 1 further can determine whether the distance value is less than a preset distance value (for example, 50 meters). When the distance value is less than the preset distance value, the determining module 106 executed by the first electronic device 1 can determine that the first electronic device 1 has arrived at the destination position.

FIG. 4 illustrates an exemplary embodiment of a flowchart of a first method of obtaining the navigation route of the first electronic device 1 from the second electronic device 2. The example method 400 is provided by way of example, as there are a variety of ways to carry out the method. The method 400 described below can be carried out using the configurations illustrated in FIG. 1, for example, and various elements of these figures are referenced in explaining example method 400. Each block shown in FIG. 4 represents one or more processes, methods, or subroutines, carried out in the example method 400. Additionally, the illustrated order of blocks is by example only and the order of the blocks can be changed according to the present disclosure. The example method 400 can begin at block

2201. Depending on the exemplary embodiment, additional steps can be added, others removed, and the ordering of the steps can be changed.

At block 2201, the first receiving module 102 executed by the first electronic device 1 can obtain the current position of the first electronic device 1 using the position device 16.

At block 2202, the first receiving module 102 executed by the first electronic device 1 can determine the destination position of the first electronic device 1 in response to user input of the first electronic device 1. The first receiving module 102 can calculate a first navigation route using the first navigation system 15 based on the current position of the first electronic device 1 and the destination position of the first electronic device 1. In other words, the current position of the first electronic device 1 is treated as the start position of the first electronic device 1.

In at least one exemplary embodiment, the first display device 12 is a touch screen, the first user can set the destination position of the first electronic device 1 through the touch screen, thus the first receiving module 102 executed by the first electronic device 1 can receive the destination position of the first electronic device 1. In other exemplary embodiments, the first receiving module 102 executed by the first electronic device 1 can receive the destination position of the first electronic device 1 set by the first user through another input device such as a keyboard.

At block 2203, when a preset condition is met, the first receiving module 102 executed by the first electronic device 1 can send the first navigation route, the current position and the destination position of the first electronic device 1 to the second electronic device 2.

In at least one exemplary embodiment, the preset condition can be defined to be the first navigation route is successfully obtained.

In at least one exemplary embodiment, the preset condition can be defined to be a distance value between the current position and the destination position of the first electronic device 1 being less than a preset distance value (for example 10 kilometers).

In at least one exemplary embodiment, the preset condition can be defined to be an estimated time length of the first navigation route is greater than a preset time length (for example, 1 hour). In at least one exemplary embodiment, the first receiving module 102 executed by the first electronic device 1 can calculate the estimated time length of the first navigation route using the first navigation system 15 based on a total estimated distance value of the first navigation route and a preset moving speed (for example, 60 kilometers per hour). The first receiving module 102 executed by the first electronic device 1 can calculate the total estimated distance value using the start position and the destination position of the first electronic device 1.

At block 2204, the second receiving module 103 executed by the second electronic device 2 can receive, from the first electronic device 1, the first navigation route, the current position and the destination position of the first electronic device 1. The second receiving module 103 executed by the second electronic device 2 can confirm whether the first navigation route is correct according to the current position and the destination position of the first electronic device 1. The second receiving module 103 can obtain a first confirmed navigation route according to a confirming result of whether the first navigation route is correct.

In at least one exemplary embodiment, the second receiving module 103 executed by the second electronic device 2 can display the first navigation route, the current position and the destination position of the first electronic device 1 on the second display device 2 to be confirmed by the user of the second electronic device 2. The second receiving module 103 executed by the second electronic device 2 can confirm whether the first navigation route is correct in response to user input of the second electronic device 2.

In at least one exemplary embodiment, when the first navigation route is confirmed to be correct, the second receiving module 103 executed by the second electronic device 2 can set the first navigation route as the first confirmed navigation route. When the first navigation route is confirmed to be incorrect, the second receiving module 103 executed by the second electronic device 2 can amend the first navigation route in response to user input of the second electronic device 2. The second receiving module 103 executed by the second electronic device 2 can set the amended navigation route as the first confirmed navigation route.

In at least one exemplary embodiment, the second electronic device 2 is a server that stores the road conditions surrounding the destination position of the first electronic device 1. The second receiving module 103 executed by the second electronic device 2 can confirm and amend the first navigation route according to a preset rule. For example, the preset rule can be defined to amend the first navigation route such that no traffic-blocking road condition exists in the first navigation route and the estimated time length of the first navigation route is the shortest, or the preset rule can be defined to amend the first navigation route such that no traffic-blocking road condition exists in the first navigation route and the estimated distance value of the first navigation route is the shortest. It should be noted that when the second electronic device 2 is the server, the second electronic device 2 may have the second display device 22 or not have the second display device 22. The second storage device 24 can store the road conditions surrounding the destination position of the first electronic device 1, or the second electronic device 2 can obtain the road conditions surrounding the destination position of the first electronic device 1 from anther electronic device that stores the road conditions surrounding the destination position of the first electronic device 1.

At block 2205, the sending module 104 executed by the second electronic device 2 can send the first confirmed navigation route to the first electronic device 1.

At block 2206, the first receiving module 102 executed by the first electronic device 1 can receive the first confirmed navigation route from the second electronic device 2, and set the first confirmed navigation route as the navigation route of the first electronic device 1.

FIG. 5 illustrates an exemplary embodiment of a flowchart of a second method of obtaining the navigation route of the first electronic device 1 from the second electronic device 2. The example method 500 is provided by way of example, as there are a variety of ways to carry out the method. The method 500 described below can be carried out using the configurations illustrated in FIG. 1, for example, and various elements of these figures are referenced in explaining example method 500. Each block shown in FIG. 5 represents one or more processes, methods, or subroutines, carried out in the example method 500. Additionally, the illustrated order of blocks is by example only and the order of the blocks can be changed according to the present disclosure. The example method 500 can begin at block 2211. Depending on the exemplary embodiment, additional steps can be added, others removed, and the ordering of the steps can be changed.

At block 2211, the first receiving module 102 executed by the first electronic device 1 can obtain the current position of the first electronic device 1 using the position device 16.

At block 2212, the first receiving module 102 executed by the first electronic device 1 can determine the destination position of the first electronic device 1 in response to user input of the first electronic device 1. The first receiving module 102 executed by the first electronic device 1 can send the current position and the destination position of the first electronic device 1 to the second electronic device 2.

At block 2213, the second receiving module 103 executed by the second electronic device 2 can receive, from the first electronic device 1, the current position of the first electronic device 1 and the destination position of the first electronic device 1.

At block 2214, the second receiving module 103 executed by the second electronic device 2 can calculate a second navigation route using the second navigation system 25 based on the current position and the destination position of the first electronic device 1. In other words, the current position of the first electronic device 1 is treated as the start position of the first electronic device 1.

The second receiving module 103 executed by the second electronic device 2 can further confirm whether the second navigation route is correct. The second receiving module 103 executed by the second electronic device 2 can obtain a second confirmed navigation route according to a confirming result of whether the second navigation route is correct. In at least one exemplary embodiment, when the second navigation route is confirmed to be correct, the second receiving module 103 can set the second navigation route as the second confirmed navigation route. When the second navigation route is confirmed to be incorrect, the second receiving module 103 can amended the second navigation route in response to user input of the second electronic device 2. The second receiving module 103 can set the amended navigation route as the second confirmed navigation route.

In at least one exemplary embodiment, the second receiving module 103 can display the second navigation route, the current position and the destination position of the first electronic device 1 on the second display device 22 to be reviewed and confirmed by the user of the second electronic device 2. The second receiving module 103 can confirm whether the second navigation route is correct in response to user input of the second electronic device 2.

In at least one exemplary embodiment, the second electronic device 2 is a server that stores the road conditions surrounding the destination position of the first electronic device 1. The second receiving module 103 can amend the second navigation route according to a preset rule. For example, the preset rule can be defined to amend the second navigation route such that no traffic-blocking road condition exists in the second navigation route and an estimated time length of the second navigation route is the shortest, or the preset rule can be defined to amend the second navigation route such that no traffic-blocking road condition exists in the second navigation route and an estimated distance value of the second navigation route is the shortest. It should be noted that when the second electronic device 2 is the server, the second electronic device 2 may have the second display device 22 or not have the second display device 22. The second storage device 24 can store the road conditions surrounding the destination position of the first electronic device 1, or the second electronic device 2 can obtain the road conditions surrounding the destination position of the first electronic device 1 from anther electronic device that stores the road conditions surrounding the destination position of the first electronic device 1.

At block 2215, the sending module 104 executed by the second electronic device 2 can send the second confirmed navigation route to the first electronic device 1.

At block 2216, the first receiving module 102 can receive the second confirmed navigation route from the second electronic device 2, and set the second confirmed navigation route as the navigation route of the first electronic device 1.

FIG. 6 illustrates an exemplary embodiment of a flowchart of a third method of obtaining the navigation route of the first electronic device 1 from the second electronic device 2. The example method 600 is provided by way of example, as there are a variety of ways to carry out the method. The method 600 described below can be carried out using the configurations illustrated in FIG. 1, for example, and various elements of these figures are referenced in explaining example method 600. Each block shown in FIG. 6 represents one or more processes, methods, or subroutines, carried out in the example method 600. Additionally, the illustrated order of blocks is by example only and the order of the blocks can be changed according to the present disclosure. The example method 600 can begin at block 2221. Depending on the exemplary embodiment, additional steps can be added, others removed, and the ordering of the steps can be changed.

At block 2221, the first receiving module 102 executed by the first electronic device 1 can obtain the current position of the first electronic device 1 using the position device 16. The first receiving module 102 executed by the first electronic device 1 further can send the current position of the first electronic device 1 to the second electronic device 2.

At block 2222, the second receiving module 103 executed by the second electronic device 2 can receive, from the first electronic device 1, the current position of the first electronic device 1. The second receiving module 103 executed by the second electronic device 2 can determine the destination position of the first electronic device 1 in response to user input of the second electronic device 2.

At block 2223, the second receiving module 103 executed by the second electronic device 2 can calculate a third navigation route using the second navigation system 25 based on the current position of the first electronic device 1 and the destination position of the first electronic device 1.

The second receiving module 103 executed by the second electronic device 2 can further confirm whether the third navigation route is correct. The second receiving module 103 executed by the second electronic device 2 can obtain a third confirmed navigation route according to a confirming result of whether the third navigation route is correct. In at least one exemplary embodiment, when the third navigation route is confirmed to be correct, the second receiving module 103 can set the third navigation route as the third confirmed navigation route. When the third navigation route is confirmed to be incorrect, the second receiving module 103 can amend the third navigation route in response to user input of the second electronic device 2. The second receiving module 103 can set the amended navigation route as the third confirmed navigation route.

In at least one exemplary embodiment, the second receiving module 103 can display the third navigation route, the current position and the destination position of the first electronic device 1 on the second display device 22 to be reviewed and confirmed by the user of the electronic device 2. The second receiving module 103 can confirm whether the third navigation route is correct in response to user input of the second electronic device 2.

In at least one exemplary embodiment, the second electronic device 2 is a server that stores the road conditions surrounding the destination position of the first electronic device 1. The second receiving module 103 can amend the third navigation route according to a preset rule. For example, the preset rule can be defined to amend the third navigation route such that no traffic-blocking road condition exists in the third navigation route and an estimated time length of the third navigation route is the shortest, or the preset rule can be defined to amend the third navigation route such that no traffic-blocking road condition exists in the third navigation route and an estimated distance value of the third navigation route is the shortest. It should be noted that when the second electronic device 2 is the server, the second electronic device 2 may have the second display device 22 or not have the second display device 22. The second storage device 24 can store the road conditions surrounding the destination position of the first electronic device 1, or the second electronic device 2 can obtain the road conditions surrounding the destination position of the first electronic device 1 from anther electronic device that stores the road conditions surrounding the destination position of the first electronic device 1.

At block 2224, the sending module 104 executed by the second electronic device 2 can send the third confirmed navigation route to the first electronic device 1.

At block 2225, the first receiving module 102 executed by the first electronic device 1 can receive the third confirmed navigation route from the second electronic device 2, and set the third confirmed navigation route as the navigation route of the first electronic device 1.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A navigation method, the method comprising:
    establishing, at a first electronic device, a communication connection between the first electronic device and a second electronic device;
    obtaining, at the first electronic device, a current position of the first electronic device;
    sending, from the first electronic device, the current position of the first electronic device to the second electronic device;
    obtaining, at the first electronic device, a confirmed navigation route from the second electronic device, wherein the confirmed navigation route is confirmed by the second electronic device according to the current position of the first electronic device;
    navigating, at the first electronic device, according to the confirmed navigation route; and
    determining, at the first electronic device, whether the confirmed navigation route should be reconfirmed, wherein the confirmed navigation route is determined to be reconfirmed when the first electronic device meets a condition, the condition comprises a total movement time length of the first electronic device being greater than a predetermined time length.

2. The method according to claim 1, wherein the obtaining of the confirmed navigation route from the second electronic device comprises:
    determining, at the first electronic device, a destination position of the first electronic device in response to user input of the first electronic device; and
    sending, from the first electronic device, the current position and the destination position of the first electronic device to the second electronic device; and
    obtaining, at the first electronic device, the confirmed navigation route from the second electronic device.

3. The method according to claim 1, wherein the obtaining of the confirmed navigation route from the second electronic device comprises:
    determining, at the first electronic device, a destination position of the first electronic device in response to user input of the first electronic device;
    calculating, at the first electronic device, a first navigation route according to the current position and the destination position of the first electronic device;
    sending, from the first electronic device, the first navigation route, the current position and the destination position of the first electronic device to the second electronic device;
    receiving, at the first electronic device, the confirmed navigation route from the second electronic device.

4. The method according to claim 1, further comprising:
    sending, from the first electronic device, a notification that the confirmed navigation route should be reconfirmed to the second electronic device.

5. The method according to claim 1, wherein the condition further comprises the first electronic device moving off the confirmed navigation route, a total movement distance value of the first electronic device being greater than a predetermined movement distance value.

6. The method according to claim 5, wherein a determining of whether the first electronic device moves off the confirmed navigation route comprising:
    selecting, at the first electronic device, a number of positions from the confirmed navigation route;
    obtaining, at the first electronic device, the current position of the first electronic device at each predetermined time interval;
    continuously calculating, at the first electronic device, a distance value between the current position of the first electronic device and nearest one of the number of positions, wherein the nearest one of the number of positions is located ahead of the current position of the first electronic device;
    continuously calculating, at the first electronic device, a difference value between two adjacent calculated distance values by subtracting a current calculate distance value from a previously calculated distance value; and
    determining, at the first electronic device, the first electronic device moves off the confirmed navigation route when the difference value is greater than a preset value, and determining, at the first electronic device, the first electronic device moves according to the confirmed navigation route when the difference value is less than or equal to the preset value.

7. The method according to claim 1, further comprising:
    continuously obtaining, at the first electronic device, the current position of the first electronic device;
    continuously sending, from the first electronic device, the current position of the first electronic device to the second electronic device, so as to enable the second electronic device to monitor whether the confirmed navigation route should be reconfirmed.

8. A first electronic device, comprising:
a first communication device;
a position device;
a storage device; and
at least one processor, wherein the storage device stores one or more programs that, when executed by the at least one processor, cause the at least one processor to:
establish, at the first electronic device, a communication connection between the first electronic device and a second electronic device;
obtain, at the first electronic device, a current position of the first electronic device;
send, from the first electronic device, the current position of the first electronic device to the second electronic device;
obtain, at the first electronic device, a confirmed navigation route from the second electronic device, wherein the confirmed navigation route is confirmed by the second electronic device according to the current position of the first electronic device;
navigate, at the first electronic device, according to the confirmed navigation route; and
determine, at the first electronic device, whether the confirmed navigation route should be reconfirmed, wherein the confirmed navigation route is determined to be reconfirmed when the first electronic device meets a condition, the condition comprises a total movement time length of the first electronic device being greater than a predetermined time length.

9. The first electronic device according to claim 8, wherein the obtaining of the confirmed navigation route from the second electronic device comprises:
determining, at the first electronic device, a destination position of the first electronic device in response to user input of the first electronic device; and
sending, from the first electronic device, the current position and the destination position of the first electronic device to the second electronic device; and
obtaining, at the first electronic device, the confirmed navigation route from the second electronic device.

10. The first electronic device according to claim 8, wherein the obtaining of the confirmed navigation route from the second electronic device comprises:
determining, at the first electronic device, a destination position of the first electronic device in response to user input of the first electronic device;
calculating, at the first electronic device, a first navigation route according to the current position and the destination position of the first electronic device;
sending, from the first electronic device, the first navigation route, the current position and the destination position of the first electronic device to the second electronic device;
receiving, at the first electronic device, the confirmed navigation route from the second electronic device.

11. The first electronic device according to claim 8, wherein the at least one processor is further caused to:
send, from the first electronic device, a notification that the confirmed navigation route should be reconfirmed to the second electronic device.

12. The first electronic device according to claim 8, wherein the condition further comprises the first electronic device moving off the confirmed navigation route, a total movement distance value of the first electronic device being greater than a predetermined movement distance value.

13. The first electronic device according to claim 12, wherein a determining of whether the first electronic device moves off the confirmed navigation route comprising:
selecting, at the first electronic device, a number of positions from the confirmed navigation route;
obtaining, at the first electronic device, the current position of the first electronic device at each predetermined time interval;
continuously calculating, at the first electronic device, a distance value between the current position of the first electronic device and nearest one of the number of positions, wherein the nearest one of the number of positions is located ahead of the current position of the first electronic device;
continuously calculating, at the first electronic device, a difference value between two adjacent calculated distance values by subtracting a current calculate distance value from a previously calculated distance value; and
determining, at the first electronic device, the first electronic device moves off the confirmed navigation route when the difference value is greater than a preset value, and determining, at the first electronic device, the first electronic device moves according to the confirmed navigation route when the difference value is less than or equal to the preset value.

14. The first electronic device according to claim 8, wherein the at least one processor is further caused to:
continuously obtain, at the first electronic device, the current position of the first electronic device;
continuously send, from the first electronic device, the current position of the first electronic device to the second electronic device, so as to enable the second electronic device to monitor whether the confirmed navigation route should be reconfirmed.

15. A navigation method, the method comprising:
receiving, from a first electronic device, a current position of the first electronic device;
obtaining, at a second electronic device, a confirmed navigation route according to the current position of the first electronic device;
sending, from the second electronic device, the confirmed navigation route to the first electronic device; and
obtaining, at the second electronic device, a reconfirmed navigation route when the confirmed navigation route should be reconfirmed, wherein the confirmed navigation route is determined to be reconfirmed when the first electronic device meets a condition, the condition comprises a total movement time length of the first electronic device being greater than a predetermined time length.

16. The method according to claim 15, further comprising:
receiving, at the second electronic device, a destination position of the first electronic device from the first electronic device, wherein the confirmed navigation route is confirmed according to the current position and the destination position of the first electronic device.

17. The method according to claim 15, further comprising:
receiving, at the second electronic device, a destination position and a first navigation route from the first electronic device; and
obtaining, at the second electronic device, the confirmed navigation route according to a confirming result of whether the first navigation route is correct, wherein the confirming result is obtained according to the current position and the destination position of the first electronic device.

18. The method according to claim 15, further comprising:
determining, at the second electronic device, a destination position of the first electronic device in response to user input of the second electronic device; and
obtaining, at the second electronic device, the confirmed navigation route according to the current position and the destination position of the first electronic device.

19. The method according to claim 18, further comprising:
displaying, at the second electronic device, a navigation route that needs to be confirmed on a display device of the second electronic device, so as to enable a user of the second electronic device to confirm the displayed navigation route; and
obtaining, at the second electronic device, the confirmed navigation route in response to user input of the second electronic device.

20. The method according to claim 19, further comprising:
continuously obtaining, at the second electronic device, the current position of the first electronic device from the first electronic device;
displaying, at the second electronic device, the current position of the first electronic device on the display device, so as to enable the user of the second electronic device to monitor whether the confirmed navigation route should be reconfirmed.

21. The method according to claim 20, wherein the second electronic device pre-stores road conditions surrounding the destination position of the first electronic device, the method further comprises:
continuously obtaining, at the second electronic device, the current position of the first electronic device;
determining, at the second electronic device, whether the confirmed navigation route should be reconfirmed according to the current position and the destination position of the first electronic device, and the road conditions surrounding the destination position of the first electronic device.

22. The method according to claim 18, wherein the second electronic device pre-stores road conditions surrounding the destination position of the first electronic device, and the confirmed navigation route is confirmed at the second electronic device according to a preset rule based on the road conditions surrounding the destination position of the first electronic device.

23. An electronic device comprising:
at least one processor; and
a storage device, wherein the storage device stores one or more programs that, when executed by the at least one processor, cause the at least one processor to:
receive, from a first electronic device, a current position of the first electronic device;
obtain, at the electronic device, a confirmed navigation route according to the current position of the first electronic device;
send, from the electronic device, the confirmed navigation route to the first electronic device; and
obtain, at the electronic device, a reconfirmed navigation route when the confirmed navigation route should be reconfirmed, wherein the confirmed navigation route is determined to be reconfirmed when the first electronic device meets a condition, the condition comprises a total movement time length of the first electronic device being greater than a predetermined time length.

24. The electronic device according to claim 23, wherein the at least one processor is further caused to:
receive, at the electronic device, a destination position of the first electronic device from the first electronic device, wherein the confirmed navigation route is confirmed according to the current position and the destination position of the first electronic device.

25. The electronic device according to claim 23, wherein the at least one processor is further caused to:
receive, at the electronic device, a first navigation route from the first electronic device;
receive, at the electronic device, a destination position of the first electronic device from the first electronic device; and
obtain, at the electronic device, the confirmed navigation route according to a confirming result of whether the first navigation route is correct, wherein the confirming result is obtained according to the current position and the destination position of the first electronic device.

26. The electronic device according to claim 23, wherein the at least one processor is further caused to:
determine, at the electronic device, a destination position of the first electronic device in response to user input of the electronic device; and
obtain, at the electronic device, the confirmed navigation route according to the current position and the destination position of the first electronic device.

27. The electronic device according to claim 26, wherein the at least one processor is further caused to:
display, at the electronic device, a navigation route that needs to be confirmed on a display device of the electronic device, so as to enable a user of the electronic device to confirm the displayed navigation route; and
obtain, at the electronic device, the confirmed navigation route in response to user input of the electronic device.

28. The electronic device according to claim 27, wherein the at least one processor is further caused to:
continuously obtain, at the electronic device, the current position of the first electronic device from the first electronic device;
display, at the electronic device, the current position of the first electronic device on the display device, so as to enable the user of the electronic device to monitor whether the confirmed navigation route should be reconfirmed.

29. The electronic device according to claim 28, wherein the electronic device pre-stores road conditions surrounding the destination position of the first electronic device, the at least one processor is further caused to:
continuously obtain, at the electronic device, the current position of the first electronic device;
determine, at the electronic device, whether the confirmed navigation route should be reconfirmed according to the current position and the destination position of the first electronic device, and the road conditions surrounding the destination position of the first electronic device.

30. The electronic device according to claim 26, wherein the electronic device pre-stores road conditions surrounding the destination position of the first electronic device, and the confirmed navigation route is confirmed by the at least one processor according to a preset rule based on the road conditions surrounding the destination position of the first electronic device.

\* \* \* \* \*